(12) United States Patent
Podgorny et al.

(10) Patent No.: US 8,341,167 B1
(45) Date of Patent: Dec. 25, 2012

(54) CONTEXT BASED INTERACTIVE SEARCH

(75) Inventors: Igor A. Podgorny, San Diego, CA (US);
Amit Rohatgi, San Diego, CA (US);
Paul Coletta, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 544 days.

(21) Appl. No.: 12/363,630

(22) Filed: Jan. 30, 2009

(51) Int. Cl.
*G06F 17/00* (2006.01)

(52) U.S. Cl. .................................. 707/758; 707/802

(58) Field of Classification Search .................. None
See application file for complete search history.

(56) References Cited

U.S. PATENT DOCUMENTS

| | | | |
|---|---|---|---|
| 5,278,980 A * | 1/1994 | Pedersen et al. ................. 1/1 |
| 6,489,968 B1 | 12/2002 | Ortega et al. |
| 6,914,084 B1 | 7/2005 | Soczka-Guth et al. |
| 7,657,518 B2 | 2/2010 | Budzik et al. |
| 2002/0104087 A1 | 8/2002 | Schaffer et al. |
| 2004/0068486 A1 | 4/2004 | Chidlovskii |
| 2005/0004889 A1 * | 1/2005 | Bailey et al. ................. 707/1 |
| 2005/0165753 A1 | 7/2005 | Chen et al. |
| 2006/0026147 A1 | 2/2006 | Cone et al. |
| 2006/0212422 A1 | 9/2006 | Khilani et al. |
| 2006/0288023 A1 | 12/2006 | Szabo |
| 2006/0294071 A1 | 12/2006 | Weare et al. |
| 2007/0067279 A1 | 3/2007 | Bonabeau et al. |
| 2007/0174260 A1 | 7/2007 | Bachman et al. |
| 2007/0185864 A1 | 8/2007 | Budzik et al. |
| 2007/0185865 A1 | 8/2007 | Budzik et al. |
| 2007/0208730 A1 | 9/2007 | Agichtein et al. |
| 2007/0250500 A1 | 10/2007 | Ismalon |
| 2007/0282797 A1 | 12/2007 | Wang et al. |
| 2007/0288514 A1 | 12/2007 | Reitter et al. |
| 2008/0016040 A1 | 1/2008 | Jones et al. |
| 2009/0112828 A1 * | 4/2009 | Rozenblatt ................. 707/4 |
| 2010/0057728 A1 * | 3/2010 | Quick et al. ................. 707/5 |

OTHER PUBLICATIONS

Faceted Metadata Search—Search Tools Report; "Faceted Metadata Search and Browse"; http://www.searchtools.com/info/faceted-metadata.html; Mar. 30, 2007, (7 Pages).

* cited by examiner

Primary Examiner — Belix M Ortiz Ditren
(74) Attorney, Agent, or Firm — Osha Liang LLP (57) ABSTRACT

A method for searching within a product context. The method includes receiving a first search phrase for a search within the product context, and evaluating the first search phrase based on the product context. Evaluating the first search phrase includes obtaining a plurality of keywords from the first search phrase, and identifying a facet using the plurality of keywords. The facet is contextually related to a keyword of the plurality of keywords, and the facet and the plurality of keywords are used to obtain a plurality of search terms. The evaluating the search phrase further includes applying a backward filter to revise the plurality of search terms into a second search phrase. The method further includes displaying the second search phrase.

22 Claims, 8 Drawing Sheets

CONTEXT BASED INTERACTIVE SEARCH

CROSS-REFERENCE TO RELATED APPLICATIONS

Subject matter described herein may be related to subject matter described in U.S. patent application Ser. No. 12/112,516, entitled "Domain Based Interactive Search," in the names of Igor A. Podgorny, Amit Rohatgi, Floyd Morgan, and Paul Coletta, and in U.S. patent application Ser. No. 12/112,516, entitled "Method and System for Generating a Dynamic Help Document," in the names of Igor A. Podgorny, Amit Rohatgi, and Paul Coletta. U.S. patent application Ser. No. 12/112,516 and U.S. patent application Ser. No. 12/112,516 are hereby incorporated by reference in their entirety.

BACKGROUND

Consumers constantly search for content stored locally and/or over an external network (e.g., the Internet). To search for content, users typically enter a search phrase into a field of a user interface. The search phrase may include a string of one or more keywords, and/or a question. The search query are compared with a content database to identify objects, such as excerpts, documents, images, programs, and/or descriptions containing terms from the search phrase. Thereafter, the identified objects are displayed or otherwise presented to a user. The user then determines whether any of the identified objects are suitable.

Some search engines assist users in submitting the search phrase. For example, search engines may help the user complete the search phrase by providing the ending terms for the search phrase. As an example, as the user enters "where do I" into a search field, a search engine completes the "where do I" phrase with suggestions, "where do I vote," "where do I go from here," "where do I go to get a passport," or "where do I get lyrics". The user may select one of the phrases by scrolling to one of the suggestions and then selecting one to request that the search be executed with the suggested search phrase selected by the user.

SUMMARY

In general, in one aspect, the invention relates to a method for searching within a product context. The method includes receiving a first search phrase for a search within the product context, and evaluating the first search phrase based on the product context. Evaluating the first search phrase includes obtaining a plurality of keywords from the first search phrase, and identifying a facet using the plurality of keywords. The facet is contextually related to a keyword of the plurality of keywords, and the facet and the plurality of keywords are used to obtain a plurality of search terms. The evaluating the search phrase further includes applying a backward filter to revise the plurality of search terms into a second search phrase. The method further includes displaying the second search phrase.

In general, in one aspect, the invention relates to a computer system for searching within a product context. The computer system includes a processor, a facet repository configured to store a contextual relationship between a keyword of a plurality of keywords and a facet, and a management engine executing on the processor and operatively connected to the facet repository. The management engine configured to receive a first search phrase for a search within the product context, and evaluate the first search phrase based on the product context. Evaluating the first search phrase includes obtaining a plurality of keywords from the first search phrase, and identifying a facet using the plurality of keywords based on the contextual relationship between the facet and the keyword of the plurality of keywords. The facet and the plurality of keywords are used to obtain a plurality of search terms. The evaluating the search phrase further includes applying a backward filter to revise the plurality of search terms into a second search phrase. The second search phrase is displayed in a user interface.

In general, in one aspect, the invention relates to a computer readable medium that includes computer readable program code embodied therein. The computer readable program code causes a computer system to receive a first search phrase for a search within the product context, and evaluate the first search phrase based on the product context. Evaluating the first search phrase includes obtaining a plurality of keywords from the first search phrase, and identifying a facet using the plurality of keywords. The facet is contextually related to a keyword of the plurality of keywords, and the facet and the plurality of keywords are used to obtain a plurality of search terms. The evaluating the search phrase further includes applying a backward filter to revise the plurality of search terms into a second search phrase. The computer readable program code further causes the computer system to display the second search phrase.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for assisting a user in entering a search phrase. Specifically, embodiments of the invention provide suggestions of possible searches that are based on both keywords submitted by the user and derivative keywords. More specifically, embodiments of the invention provide functionality to receive a search phrase for a search within a product context. Embodiments of the invention include functionality to extract keywords from the search phrase and use the extracted key words to identify derivative keywords. The derivative keywords and the user-submitted keywords are then used to identify facets. The user-submitted keywords, derivative keywords, and facets, or a subset thereof is then used to create a suggested search phrase. The suggested search phrase may be presented to the user. Thus, embodiments of the invention suggest a search phrase that is based on user-submitted keywords as well as derivative keywords and facets.

In one or more embodiments of the invention, searches are performed within a product context. In one or more embodiments of the invention, the product context is the domain of a product providing the search engine. Examples of product contexts include the domain of a software application, a website, a user interface, a subject area of a product, etc. The product context may be specific or generic to the product. For example, the product context of a financial application may be finances, financial applications in general, internet-based financial applications, the specific financial application, the specific version of the specific financial application, etc. The product context may be used, for example, to limit the variation in possible search results and the number of possible searches that may be performed.

Figure 1:
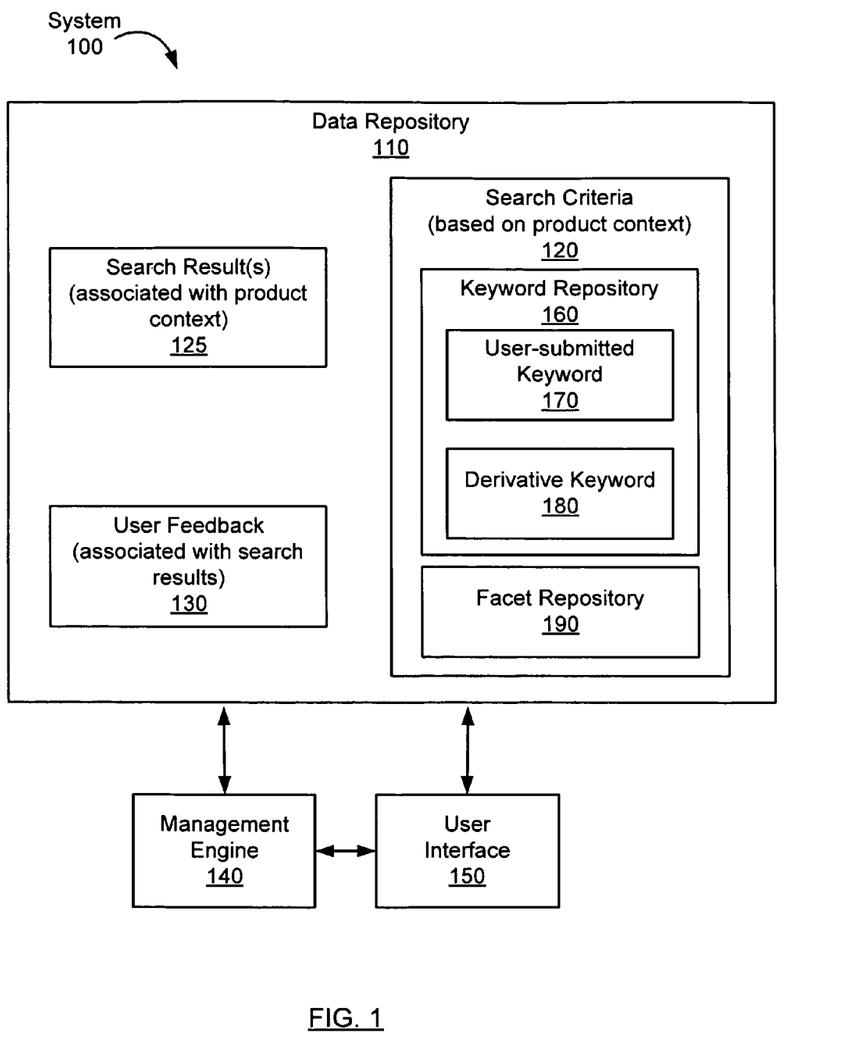
FIG. 1 shows a diagram of a system for searching in accordance with one or more embodiments of the invention.

FIG. 1 shows a system (100) in accordance with one or more embodiments of the invention. As shown in FIG. 1, the system (100) includes a data repository (110), a management engine (140), and a user interface (150). Each of these components is described below and may be located on the same device (e.g., a server, mainframe, desktop PC, laptop, PDA, television, cable box, satellite box, kiosk, telephone, mobile phone, or any other computing device) or may be located on separate devices coupled by a network (e.g., Internet, Intranet, Extranet, Local Area Network (LAN), Wide Area Network (WAN), or any other type of network), with wire and/or wireless segments.

In one or more embodiments of the invention, the system (100) is implemented using a client-server topology. The system (100) may be an enterprise application executing on one or more servers. In one or more embodiments of the invention, the system (100) may be a peer-to-peer system, or resident upon a single computing system. In addition, the system (100) is accessible from other computing devices using one or more user interfaces (e.g., user interface (150), web portals, or any other tool to access the system). In one or more embodiments of the invention, the system (100) is accessible over a network connection (not shown), such as the Internet, by one or more users. Information and/or services provided by the system (100) may also be stored and accessed over the network connection(s).

In one or more embodiments of the invention, the data repository (110) includes functionality to store search criteria (120), search results (125), and user feedback (130). In one or more embodiments of the invention, access to the data repository (110) is restricted and/or secured. As such, access to the data repository (110) may require authentication using passwords, secret questions, personal identification numbers (PINS), biometrics, and/or any other suitable authentication mechanism. Those skilled in the art will appreciate that elements or various portions of data stored in the data repository (110) may stored in a distributed fashion across multiple data repositories. In one or more embodiments of the invention, the data repository (110) is stored using a data structure. The data structure may be, but is not limited to, a flat file, hierarchical data structure, a relational data structure, or any other appropriate data structure. For example, data repository (110) may be maintained as a table in Simple Query Language (SQL) database. In addition, data in the data repository (110) may be verified against data stored in other repositories.

Continuing with FIG. 1, in one or more embodiments of the invention, the search criteria (120), shown as stored in the data repository (110), corresponds to a set of terms specific to a particular domain that are used for performing a search within the particular domain. The search criteria (120) may include a set of terms related to each product context and/or sub-product context. For example, search criteria related to an aeronautical product context may include terms related to airplane aerodynamics and airplane parts. In another example, search criteria related to a tax product context may include terms for fields within tax forms. The search criteria (120) may include (but is not limited to) complete words, incomplete words, misspelled words, numbers, sentences, and/or symbols. In one or more embodiments of the invention, the search criteria may include groups of terms. For example, the search criteria (120) may include "The Cat in the Hat", "mobile home", "Roth IRA", and other groups of terms.

In one or more embodiments of the invention, the search criterion (120) includes a keyword repository (160) and a facet repository (190). The keyword repository (160) is a repository of keywords. In one or more embodiments of the invention, the keyword repository (160) relates user-submitted keywords (170) to derivative keywords (180). A user-submitted keyword (170) in the keyword repository (160) is any keyword that may be submitted by a user. For example, the user-submitted keyword (170) may be words and other terms that a user could submit. The user-submitted keywords (170) may include misspelled words, abbreviations, and other such terms.

A derivative keyword (180) includes keywords derived from the user-submitted keywords (180). For example, the derivative keyword (180) may correspond to a synonym, a variation in spelling, a concatenation, a change in tense, a root term, and/or an abbreviation, a correct term for a common misnomer, a correct term for a commonly misunderstood term, a part of a definition, a completion of an incomplete term, a portion of a term, or otherwise related to one or more of the user-submitted keywords (170). For example, if a user-submitted keyword is "Pay", "Paid", "Paying", or any other form of the verb, "to Pay", the derivative keyword related to each of the user-submitted keywords may be "Pai". As another example, if the user-submitted keyword is "submit", the derivative keyword related to the user-submitted keyword may be "enter".

As discussed above, the keyword repository (160) relates the user-submitted keyword (170) to the derivative keyword (180). Thus, the keyword repository (160) may include multiple tools, such as a thesaurus, a spelling dictionary, a conversion index (e.g., to convert between different tenses), and other such tools. Alternatively, the keyword repository (160) may correspond to a single index that maps user-submitted keywords (170) to derivative keywords (180).

In one or more embodiments of the invention, in addition to the keyword repository (160), the search criteria (120) may also include a facet repository (190). A facet repository (190) is a storage repository that relates one or more keywords (e.g., user-submitted keywords (170), derivative keywords (180)) to facets. A facet is one or more terms that contextually correlates to the keyword. Specifically, the facet relates to the keyword(s) within the context of the product context. The relationship between the facet and the keywords may be identified through gathered search data, a knowledgebase of the product context, and other such information. For example, over time, the system (100) may learn that when users submit a certain keyword or set of keywords, the user also submits the related terms or facets. For example, the system (100) operating in the financial application product context may learn that when the user submits "where", "enter", and "dependent", the user also submits one or more of the following terms: "parent", "child", "children", "unrelated friend", "grandparent", "1040", "form", and other such related words.

In one or more embodiments of the invention, the relationship between the facets and the keywords may be based on a knowledgebase, such as through documentation, help files, and general knowledge about the subject matter of the product context. For example, terms that generally exist in the same sentence in a help file may be indicative of a relationship between the terms. In the example, a keyword facet relationship may be identified when several sentences of a help file have both terms, "W2" and "income". In such an example, "W2" may be a facet for the keyword, "income". Similarly, "income" may be a facet for the keyword "W2".

Continuing with FIG. 1, in one or more embodiments of the invention, the search criteria (120) and/or semantic rules (not shown) used to generate the search criteria (120) may be defined by an administrator, an industry professional, a user, a software application, a business, a governmental entity, or any other entity with information regarding the corresponding product context. For example, an industry professional in the medical industry may submit derivative keywords corresponding to synonyms for terms commonly known or used by patients. In one or more embodiments of the invention, the semantic rules used to generate the search criteria may be stored separately on a per product context basis (e.g., a rules database per product context) or may simply be indexed by product context.

In one or more embodiments of the invention, the search results (125) correspond to a list of results that are identified based on the search criteria (120). The search results (125) may include, but are not limited to, websites, documents (e.g., help documents, user generated documents, etc.), images, metadata, and discussion threads. In one or more embodiments of the invention, the search results (125) may include questions (e.g., questions similar to those searched by a user), answers to a user's search question, descriptions, comments, and/or any other items that match the search criteria (120). In one or more embodiments of the invention, the search results (125) are ranked based on user feedback (130) and/or a product context.

The user feedback (130) corresponds to any information regarding a search result (125) based on any action by one or more users. The user feedback (130) may include, but is not limited to, a number of times a search result (125) has been viewed, comments on the search result (125) (e.g., how helpful the search result was), a user rating of the search result (125), a distribution of search result (125) (e.g., forwarding/emailing of the search result), and/or any other user activity metadata associated with the search result (125). In one or more embodiments of the invention, the user feedback (130) is categorized by user, user qualification (e.g., an industry professional, an average user, a software developer, an administrator, or any other relevant user qualification), user characteristics (e.g., infrequent user, new user, or any other relevant user characteristic), a time period (e.g., by month, by year, or any other relevant time period). In one or more embodiments of the invention, the search results (125) may vary in rank based on location/circumstance. For example, the ranks for search results may vary for the search terms "real estate" based on whether the website application is tax related or property sales related.

Continuing with FIG. 1, in one or more embodiments of the invention, the management engine (140) corresponds to a process, software application, and/or computer system that includes functionality to generate the search criteria (120), generate and suggest search phrases based on partially or fully entered search phrases, and perform a search based on a user-selected search phrase.

For example, the management engine may generate a search criterion by evaluating a search term "ssn" within a tax product context. In this example, the searching by the management engine may include using tax related keywords in a general data repository, searching within tax related data repositories, searching through a mapping of search terms, and/or using other suitable means to determine that "ssn" is an abbreviation for "social security number" within the tax product context. Accordingly, the management engine may generate a derivative keyword for "ssn" as "social security number." In another example, the management engine may generate a search criterion by evaluating a search term "ssn" within a wildlife product context, and determine that "ssn" a derivative keyword for "ssn" is "Species Survival Network" in the wildlife product context. Accordingly, the management engine may include "Species Survival Network" in the derivative keywords for the wildlife product context.

The management engine (140) may also include functionality to identify search results based on the search criteria (120). In one or more embodiments of the invention, the management engine (140) may identify previously asked questions, responses, help documents, websites, etc. as search results that include keywords in the search criteria (120). In one or more embodiments of the invention, the management engine (140) may include functionality to obtain a new response to a question submitted by a user. For example, the management engine (140) may determine that the search criteria is associated with a legal product context and accordingly, may post the search criterion in an online legal forum to obtain search results, i.e., responses from users.

Continuing with the management engine (140) of FIG. 1, in one or more embodiments of the invention, the management engine (140) may include functionality to value user feedback (130) pertaining to search results to obtain the search results (125). Search results (125) with a positive user feedback (130) are ranked higher than search results (125) with a negative user feedback (130). In one or more embodiments of the invention, search results (125) that are viewed, distributed, or otherwise used more frequently used are ranked higher than search results (125) that are not used as frequently. In one or more embodiments of the invention, the management engine (140) may rank a search result depending on the specified product context. For example, a search result with home interest deduction may be ranked low within a product context of taxable income (e.g., a software application interface for entering taxable income) because home interest is not related to taxable income. In the example, the home interest deduction may be ranked high within a product context of tax deductions (e.g., a software application interface for entering deductions) because the home interest is used for a tax deduction.

Continuing with FIG. 1, the user interface (150) corresponds to any user interface configured to provide user with access to the system (100) and any services provided by the system (100) in accordance with one or more embodiments of the invention. The user interface (150) may be a web interface, graphical user interface (GUI), command line interface, or other user interface accessible through a computer system (or computing device). In one or more embodiments of the invention, the user interface (150) includes one or more web pages that may be accessed from a computer with a web browser and/or internet connection. Alternatively, the user interface (150) may be an application that resides on a computing system (or computing device), such as personal computers (PCs), mobile phones, personal digital assistants (PDAs), and/or other computing devices of the users and that communicate with the system (100) via one or more network connections and protocols. Regardless of the architecture of the system, communication between the system (100) and the user interface (150) may be secure, as described above.

Figure 2:
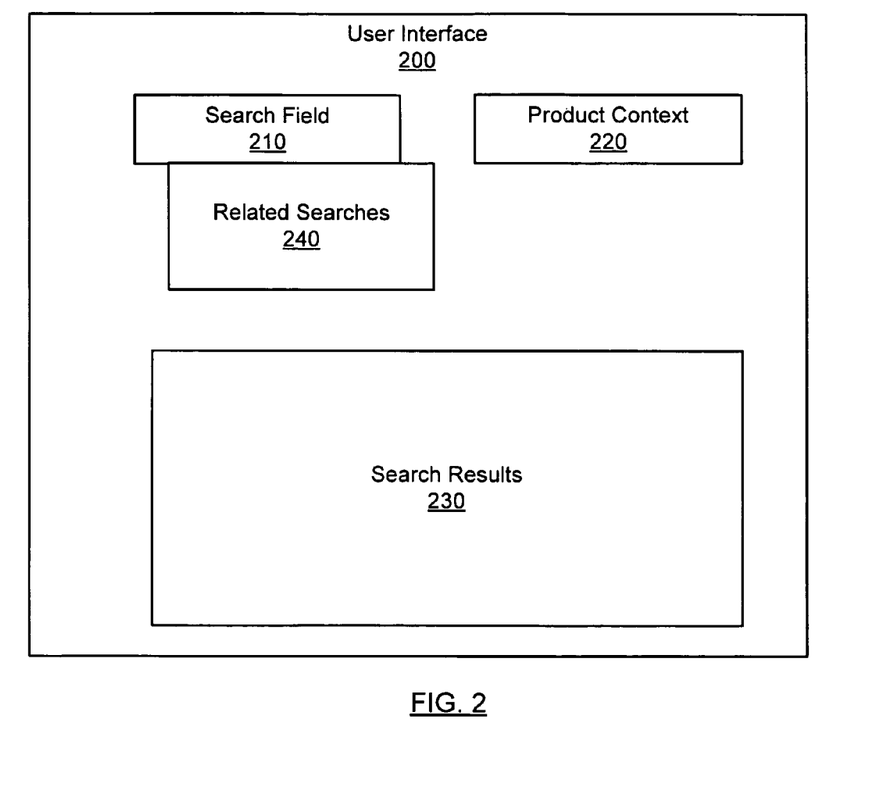
FIG. 2 shows a user interface for searching in accordance with one or more embodiments of the invention.

FIG. 2 shows a user interface for searching in accordance with one or more embodiments of the invention. The user interface (200) includes functionality to allow a user (or an automated equivalent) to enter a search phrase into a search field (210). In one or more embodiments of the invention, while the user is entering the search phrase, the user interface (200) displays related searches (240). The related searches (240) include search phrases that are suggested by the user interface (210). Specifically, the related searches (240) include the search phrases generated by the management engine (discussed above) based on keywords in the search phrase.

In one or more embodiments of the invention, the user may select a search phrase from the related searches (240) to execute a search. For example, the user may scroll to the search phrase in the related searches (240), submit an alphanumeric identifier of the search phrase, or perform another such operation to access the related searches. Alternatively, the user may select a submit button (not shown) to request that a search is performed with the user has entered search phrase. For example, if the user submits, "how do I enter", the related searches (240) may display "where do I submit income on form 1040", "how do I enter my name", and "where do I enter my name". Thus, in the example, the user may select "how do I enter", "where do I submit income on form 1040", "how do I enter my name", or "where do I enter my name" using the user interface (200). Further, the user may select a related searches (240) and not select the search button to have the user interface (200) present related searches that are related to the selected related search. Thus, the user may continue to refine the user's search without having to perform the search.

In one or more embodiments of the invention, the user interface (200) further includes a product context field (220). In one or more embodiments of the invention, the product context field (220) allows the user to submit a product context. Alternatively, the product context may be automatically set or derived from a developer of the product, the data in the data repository, the form that the user is using when the user navigates to the search field, an administrator, etc.

For example, the current form (not shown) or other document being displayed within the user interface (200) may be used to determine automatically the product context. In the example, entry into the product context field (220) may not be required. In one or more embodiments of the invention, the current form corresponds to a form that the user is viewing when the user selects to perform the search. For example, in a user interface being used to file tax returns, if the user is viewing a 1040 form, the product context may be set as the 1040 context. Alternatively, the product context may be deduced as taxes and sub-product context of taxable income. In this example, a search performed by the user may be automatically evaluated based on the tax product context and/or the taxable income sub-product context without requiring the user to specify a product context.

The user interface (200) may further include search results (230) based on the search term and product context. In one or more embodiments of the invention, each search result in the user interface includes a link to the full object corresponding to the search result. For example, the search results may include a search result corresponding to a question asked by a previous user. The question may be displayed as a link. When the user selects the question in the search results, the user may be redirected to a page that shows the question and answers submitted by other users.

In one or more embodiments of the invention, the search results (230) correspond to a display of the ranked search results, discussed above, based on the search terms entered in the search field (210) and the product context in the product context field (220). In one or more embodiments of the invention, the search results (230) are updated while input, such as a search phrase, is being entered into the search field (210). In another embodiment of the invention, a user completes entering the input in the search field (210) before the search results (230) are displayed. In one or more embodiments of the invention, the search results (230) are ordered by rank. In one or more embodiments of the invention, the search results may be displayed with user feedback (not shown) corresponding to each search result. In another embodiment of the invention, each of the entries within the search results (230) may be ranked by the current user. In another embodiment of the invention, the search results (230) are displayed with an indication of a response by a qualified individual with knowledge or expertise related to the particular product context.

In one or more embodiments of the invention, the input fields (e.g., search field (210) and product context field (220)) may correspond to any implementation of an input tool. For example, the input fields may correspond to textual fields, check boxes, radio buttons, file imports, web downloads, or any other applicable implementation of obtaining input.

Figure 3A:
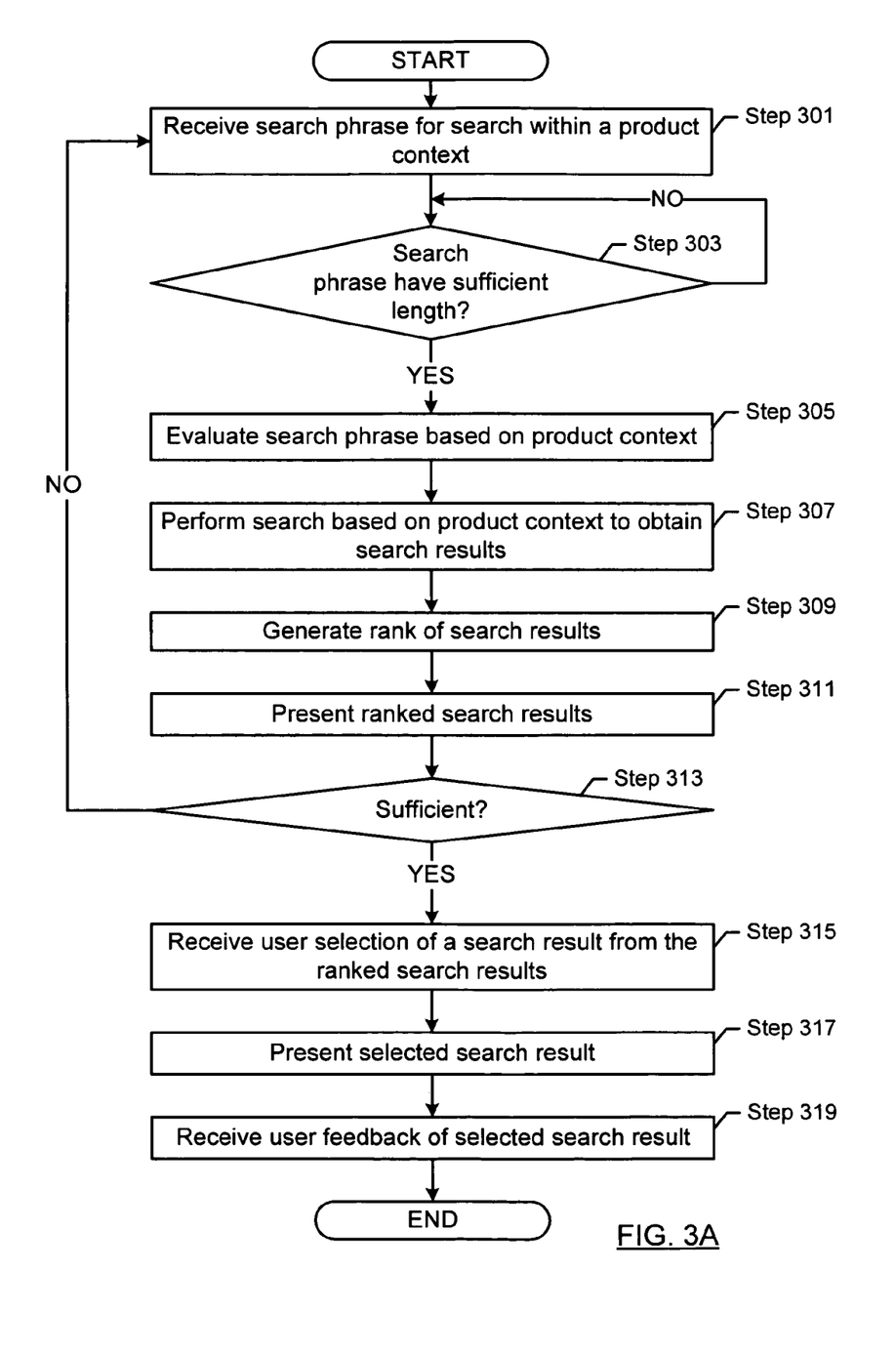
FIGS. 3A-3C shows flowcharts for searching in accordance with one or more embodiments of the invention.
Figure 3B:
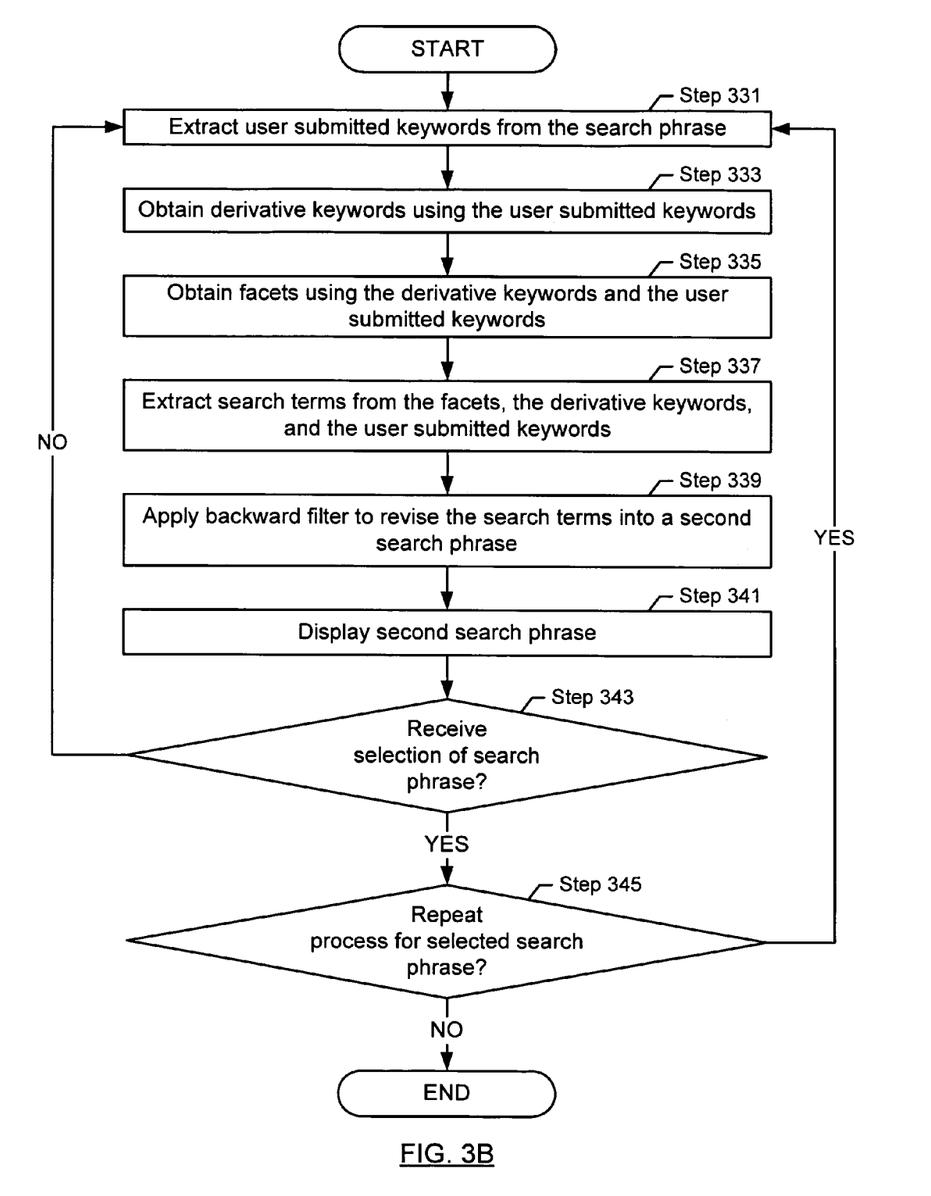
Figure 3C:
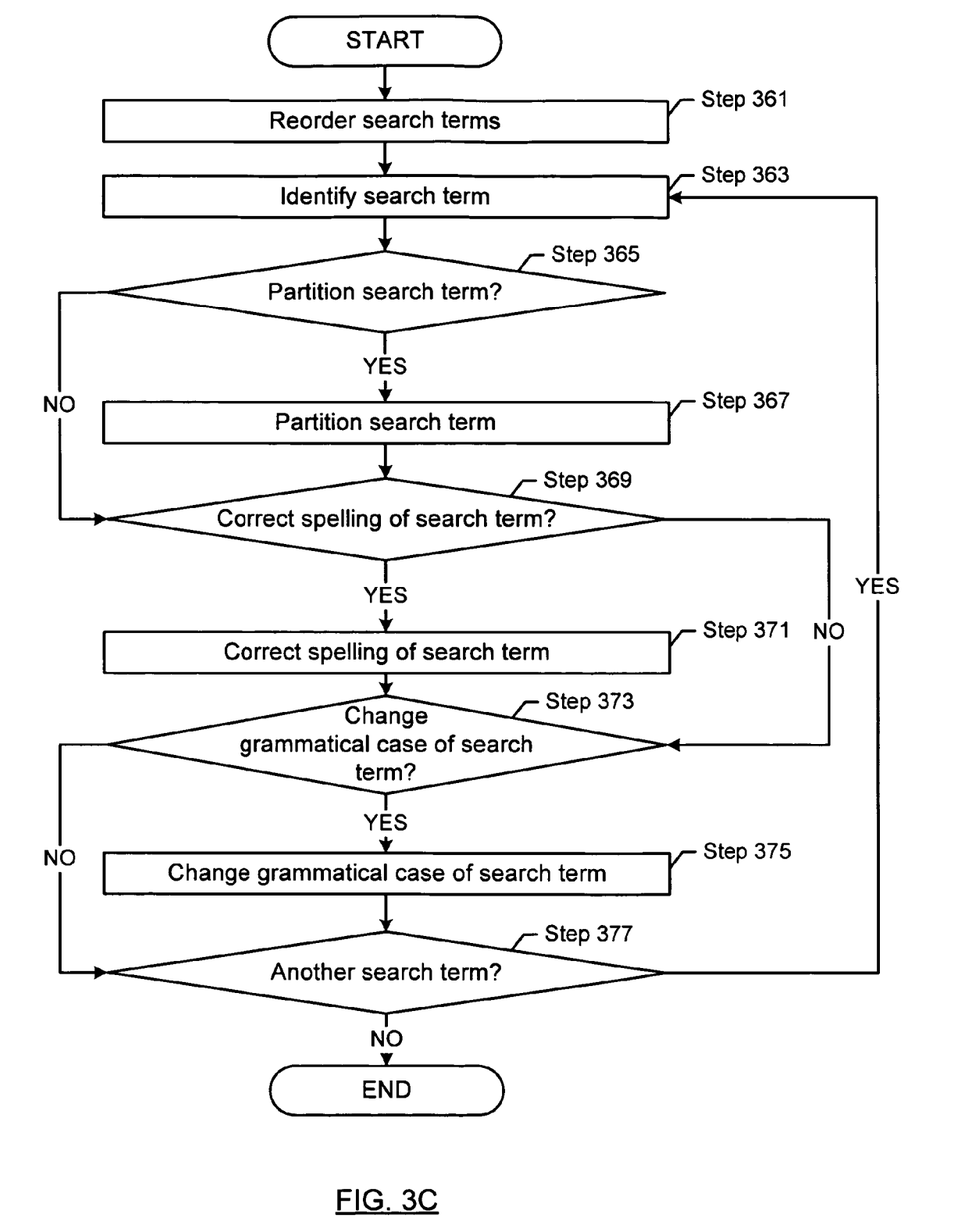

FIGS. 3A-3C shows flowcharts for searching in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. In addition, steps such as send and receive acknowledgements have been omitted to simplify the presentation.

FIG. 3A shows a flowchart for assisting a user in performing a search in accordance with one or more embodiments of the invention. In step 301, a search phrase is received for a search within a product context. In one or more embodiments of the invention, a product context is received with the search phrase. For example, the product context may be entered separately from the search phrase. In another embodiment of the invention, the product context is deduced or preset as discussed above. In one or more embodiments of the invention, as the user is entering terms into the search field, the management engine analyzes the terms to identify related searches. Alternatively or additionally, the user may select a feature (e.g., by selecting a button or pressing a dedicated key stroke) in the user interface to request related searches.

In step 303, a determination is made whether the search phrase is of a sufficient length. In one or more embodiments of the invention, while the user submits search terms in the search phrase, the search terms are analyzed. In one or more embodiments of the invention, some of the search terms are excluded during the analysis. For example, the excluded search terms may include prepositions, articles, words indicating opinions, and other such terms. The remaining search terms may be counted to determine whether a sufficient number exists to generate related search phrases.

In step 305, the search phrase is evaluated based on the product context. Evaluating the search phrase is discussed below and in FIG. 3B. In one or more embodiments of the invention, after evaluating the search phrase, one or more suggested search phrases and the user submitted search phrase is displayed. Thus, the user may select a search phrase to perform a search.

In step 307, a search is performed based on the product context to obtain search results. Specifically, the selected search phrase is used to perform the search. In one or more embodiments of the invention, the data repositories specifically related to a particular product context are searched. The search may be performed within a particular software application, on an internal network, on an external network (e.g., the Internet), on a discussion forum, or any data repository with relevant information. For example, the search results may be obtained by comparing the keywords in the selected search phrase with data from one or more data repositories. In one or more embodiments of the invention, the ordering of the keywords in the search phrase may be used to identify the relevancy of each search result. For example, search results that have the same ordering of terms may be considered more relevant than search results that have a different order of terms. In one or more embodiments of the invention, duplicate search results may be removed from the identified search results. For example, if two help documents uploaded into a help website by two different users are found to be the same, one of the help documents may be removed from the search results.

In step 309, a rank of the search results is generated in accordance with one or more embodiments of the invention. Ranking search results may involve averaging the different ratings provided by users (e.g., regarding how useful a particular search result was to them). The ranking may also be based on comments provided by a user (e.g., based on text mining). For example, a predetermined set of words/phrases may be designated for positive comments, such as good, great, useful, helpful, wonderful, easy to use, user-friendly, etc. Further, a predetermined set of words/phrases may be designated as negative comments, such as bad, horrible, difficult, useless, insufficient information, confusing, etc. Based on the predetermined set of words/phrases, the comments may be analyzed to determine whether the comment was a positive comment or a negative comment and accordingly, a user comment may be converted into a rating using a software program or process.

In another embodiment of the invention, users' activities may be tracked and converted into a user rating. For example, the greater the number of views by users results in a higher corresponding rating. Another example may involve a rating based on the distribution of the search results by the user. For example, search results that the user or previous users adds to a favorites folder, forwards, or performs other such operations may be ranked higher than the search results that the user (or other users) has only viewed.

In one or more embodiments of the invention, the rating may be adjusted based on time. For example, a user rating of a product may automatically be reduced over time in value for ranking a search result. In another embodiment of the invention, new ratings may be given more weight in determining a ranking in when compared with older ratings. For example, for tax software that is upgraded each year, the ratings of the tax product in the current tax year (i.e., for a new version of a tax filing software) may be weighed twice as heavily as the ratings of the tax product in the previous tax year (i.e., for an old version of a tax filing software).

In one or more embodiments of the invention, the rating of a search result by an experienced user or industry professional may be weighed more heavily than that of a new user or non-industry professional. For example, the search results in a discussion forum where anyone may participate, an industry professional's positive rating verifying the correctness of a user response may be more heavily weighted than an average user's positive rating verifying the correctness of a user response. In another embodiment of the invention, the search results may be ranked differently depending on the product context and/or sub-product context. For example, a search result involving a student loan discussion may be ranked higher when a search is performed based on a product context of tax deductions than when a search is performed based on a product context of taxable income, because a student loan is related to tax deductions not taxable income. In one or more embodiments, a user may specify which criteria (e.g., user qualifications, product context relatedness, user comments, user views, usage patterns, distribution, ratings, etc.) to use for ranking the search results.

In step 311, the ranked search results are presented to the user in accordance with one or more embodiments of the invention. The search results may be presented using a user interface. The search results may also be exported to another application, displayed on a screen, posted on the Internet, stored in data repository, printed for a file, sent to a mobile device over a network, or presented in any other useful manner. In one or more embodiments of the invention, the ranked search results are presented in order of their ranking. In another embodiment of the invention, the ranked search results are presented with the user feedback that was used to rank the search results. Further, the ranked search results may be presented with information of the user providing the feedback. For example, if on a medical forum a doctor has commented and has elected to release his/her contact information, the ranked search result may be presented with the doctor's feedback and with the doctor's contact information. In one or more embodiments of the invention, the user contact information may be limited to pre-qualified or pre-verified professionals within each respective product context.

In step 313, a determination is made about whether the search results presented are sufficient and/or correct. For example, a user viewing the search results may determine whether the search results are sufficient. The user may make this determination based on the subject matter, the product context of the search result, the qualifications of users providing user feedback, whether the search results were helpful or for any other suitable reason. If the search results are determined to be insufficient or incorrect, the search terms and/or product context may be modified. Accordingly, a new search phrase may be received in step 301.

In step 315, if the determination is made that the search results are sufficient, a user selection of a search result may be received. For example, the user may select the search result using any form of input, such as a keyboard input, a mouse click, hovering over the topic, a text message, an e-mail message, voice command, or any other suitable input for indicating a selection.

In step 317, the selected search result is presented in accordance with one or more embodiments of the invention. The search result may be presented in a user interface, a printout, a display, a message, a data repository storage, or any other suitable medium through which the user can access the field. The search result may be presented as part of a form or as part of a computing environment currently being used by the user.

In step 319, the user may provide feedback about the selected search result. For example, the user may submit a comment, provide a rating, or perform any other action to provide feedback.

FIG. 3B shows a flowchart for evaluating a search phrase based on a product context in accordance with one or more embodiments of the invention. In step 331, user-submitted keywords are extracted from the search phrase in accordance with one or more embodiments of the invention. Different techniques may be used to extract the user-submitted keywords from the search phrase, such as empirical analysis, analyzing the keywords, performing natural language processing, parsing and extracting the keywords, or performing other operations.

For example, extracting the user submitted keywords may include parsing the search phrase to identify terms in the search phrase. For example, separation identifiers, such as white space, commas, semi-colons, and other such characters may be indicative of a separation of terms in the search phrase. Accordingly, the term prior to the separation identifier is separated from the term after the separation identifier. Further, multiple terms in the search phrase may be grouped into a single keyword when grouping indicators, such as quotation marks, are present in the search phrase. For example, if the search phrase includes the search terms "Roth IRA", then "Roth IRA" may be extracted as a single keyword.

When extracting user-submitted keywords from a search phrase, certain terms in the search phrase may be omitted. For example, emotion words, prepositions, and articles may be omitted. Determining which terms to omit may be based, for example, on an omission list that includes all of the keywords to omit. In one embodiment of the invention, the omission list is maintained on a per product context basis.

In step 333, derivative keywords are obtained using the user-submitted keywords in accordance with one or more embodiments of the invention. In one or more embodiments of the invention, each keyword is compared with the keyword data repository to identify derivative keywords. The derivative keywords may be also be used in the keyword data repository to identify additional derivative keywords. By identifying the derivative keywords, embodiments of the invention may identify the different ways in which the same question may be asked. For example, "Where do I enter . . . " may be asked by "Where do I submit", "Which form do I use to submit . . . ", "Which form do I use to enter . . . ", "What tax line item should be used to enter . . . ", etc.

In step 335, facets are obtained using the derivative keywords and the user-submitted keywords in accordance with one or more embodiments of the invention. In one or more embodiments of the invention, the facets are obtained by accessing the facet repository with the derivative keywords and the user submitted keywords. The facets may be obtained based on the relationships of terms in both the facet repository. For example, the facet repository may be accessed with different groups of the keywords. For example, consider the scenario in which the user submits the phrase "where do I enter" as discussed above. The terms, "where" and "enter" may be submitted as a query to the facet repository to identify terms that are related to "where" and "enter". Similarly, consider the scenario in which the derivative keywords "whichform" is identified as a synonym of "where" and "submit" is identified as a synonym of "enter". In such a scenario, the query to the facet repository may be the group, "whichform" and "enter", the group, "whichform" and "submit", or the group, "where" and "submit".

The returned result from the query to the facet repository is facets. Namely, the terms that are pre-calculated as being related to the queried group are the facets in accordance with one or more embodiments of the invention. For example, the keywords "where" and "enter" may return facets "W2", "income", "dependent data", and other such terms. The relationship between the facets and the queried group may be based, for example, on how frequently the facets appear in searches that also include terms from the query group. As another example, the relationship may be based on a regulation from a legal authority. For example, if the group is "auto" and "expense", the facet, "standard mileage rate", may be returned as a result of the query to the facet repository based on the use of standard mileage rate in determining how much can be deducted for the use of a car during a taxable year. Thus, although few users have used "auto", "expense", and "standard mileage rate" in the same search, "auto", "expense", and "standard mileage rate" may be contextually related.

Each facet returned from the facet repository may have a likelihood indicator to identify the likelihood that the facet is in a search phrase that may be selected by the user. The likelihood indicator may be based on the percentage of times the facet is in a selected search phrase as compared to other facets. For example, when a search phrase includes the term "deduction" in the product context of taxes, the facet "artistic works" may have a lower likelihood indicator value than the facet "business expense" when more users are likely to search for how to deduct business expenses as opposed to deducting charitable contributions of artistic works. Alternatively or additionally, the likelihood indicator may be based on the number of times the same facet is returned for different subsets of keywords.

In one or more embodiments of the invention, fewer facets are identified when the product context is more specific. Specifically, in one or more embodiments of the invention, the product context limits the amount of searching to perform to identify the facets. In such embodiments, a specific product context may be used to increase the speed at which search results are display for the user.

In step 337, search terms are extracted from the facets, the derivative keywords, and the user-submitted keywords in accordance with one or more embodiments of the invention. Specifically, the terms of the suggested search phrase are identified using the facets, the derivative keywords, and the user-submitted keywords. In one or more embodiments of the invention, only a subset of the facets, the derivative keywords, and the user-submitted keywords are a part of the search terms used in a suggested search phrase. Various techniques may be used to identify the terms that are used for the suggested search phrase. One technique may use a rules based approach. For example, a rule may specify that either the user-submitted keyword or the derivative keyword, which is derived from the user-submitted keyword, is in a single suggested search phrase. Another rule may specify that when two terms are synonyms, only one term is in the suggested search phrase. Another rule may specify that two search terms cannot be in the same search phrase when both search terms are of the same type of term (e.g., if "where" and "how" are in the set of keywords and facets, then either "where" or "how" is in the search terms). Other rules may be used as an alternative to or in addition to those rules discussed above. Other approaches to selecting search terms may be used without departing from the scope of the invention.

In step 339, a backward filter is applied to revise the search terms into a second search phrase. In one or more embodiments of the invention, the backward filter transforms the search terms into a natural language. For example, the backward filter may reorder the search terms to form a question for a suggested search phrase. FIG. 3C shows a flowchart for applying a backward filter in accordance with one or more embodiments of the invention.

In one or more embodiments of the invention, the result of the backward filter is a suggested search phrase. Multiple suggested search phrases may be created by applying the backward filter to different sets of search terms obtained from extracting search terms in step 237. In step 341, the suggested search phrases are displayed in accordance with one or more embodiments of the invention. In one or more embodiments of the invention, the suggested search phrases are displayed in the related searches section of the user interface. In one or more embodiments of the invention, the suggested search phrases are displayed in a drop down box while the user is entering search terms.

In step 343, a determination is made about whether any of the search phrases is selected in accordance with one or more embodiments of the invention. Specifically, a determination is made about whether the user continues entering search terms or selects one of the search phrases. If the user continues to enter search terms, then the process may repeat with step 331 to include the additional search terms.

Alternatively, if the user selects a search phrase, the search phrase selected by the user may be one of the suggested search phrases or the user-submitted search phrase. If the selected search phrase is one of the suggested search phrases, then the selected suggested search phrase may be displayed in the search field. At this stage, a determination is made about whether to repeat steps 331-341 using the selected suggested search phrase as the user's submitted search phrase. Specifically, each time the user selects a suggested search phrase, additional suggested search phrases may be created based on the user's selected suggested search phrase. In one or more embodiments of the invention, the user may select a submit button to execute a search using the search phrase displayed in the search field. Alternatively, the user may perform other actions to indicate that the user wants to execute a search on a different search phrase.

For example, consider the scenario in which the user enters, "where do I enter". After processing the search phrase "where do I enter", the user interface may present as a suggestion, "which form do I use to enter data from W2". Because this search phrase is close to the search that the user is contemplating, the search phrase, "which form do I use to enter data from W2" is the selected by the user. Accordingly, "which form do I use to enter data from W2" displayed in the search field in accordance with one or more embodiments of the invention. The analysis may continue by identifying related searches for the search phrase "which form do I use to enter data from W2". Specifically, after analyzing "which form do I use to enter data from W2", another suggested search phrase may be presented. For example, the next suggested search phrase might be "which form do I use to enter income listed on my W2". After seeing the next suggested search phrase, the user may select the next suggested search phrase. Further, the user may select the submit button to execute a search using the search phrase "which form do I use to enter income listed on my W2".

FIG. 3C shows a flowchart for applying a backward filter to revise the search terms into a second search phrase in accordance with one or more embodiments of the invention. In one or more embodiments of the invention, the backward filter remaps the search terms into human understandable form. In step 361, the search terms are reordered in accordance with one or more embodiments of the invention. In one or more embodiments of the invention, the reordering of search terms in the search phrase may be performed, for example, using a rules-based approached. For example, the rules based approach may specify that term corresponding to a question word start the search phrase. A dictionary of terms may be used to identify which term is a question term. Similarly, another rule may specify that verbs are in the middle of the search phrase. Accordingly, words that are verbs are placed in the middle of the search phrase. Another rule may indicate that personal pronouns precede the subject while nouns representing things are to be placed after the subject. The above provides a few examples of the rules that may be used in a rules-based approach. Other rules other approaches may be used in alternative embodiments of the invention.

In step 363, a search term is identified. In one or more embodiments of the invention, any unprocessed search term from the search phrase is selected. In step 365, a determination is made about whether to partition the search term. If the determination is made to partition the search term, then the search term is partitioned into multiple search terms in step 367. Specifically, if the search term is a concatenation of one or more terms, then the search term is partitioned. For example, "wheretoenter" may be partitioned into "where to enter". Concatenating the search terms assists in identifying derivative terms and facets. However, when search terms are concatenated, partitioning the search terms after generating a search phrase is performed so that the search phrase is in human readable format in accordance with one or more embodiments of the invention. Determining when to partition search terms may be based on an index or on a custom-built dictionary.

In step 369, a determination is made about whether to correct the spelling of the search term. If a determination is made to correct the spelling of the search term, then the spelling of the search term is corrected in step 371. Specifically, in one or more embodiments of the invention, the search term is mapped into the correct spelling for the search term. Correcting the spelling may be based on a data repository of terms, such as a spelling dictionary. For example, "pai" (used as an example above) may be remapped into "pay".

In step 373, a determination is made about whether to change the grammatical case of the search term. If a determination is made to change the grammatical case of a search term, then the grammatical case of the search term is changed in step 375. In one or more embodiments of the invention, changing the grammatical case includes using a rules based approach. For example, if the search term is a verb, then a determination is made whether the subject of the search phrase is singular or plural and the case of the verb is adjusted accordingly. Additional grammatical rules may be used to transform the search term into a grammatically correct search term within the context of the search phrase.

In step 377, a determination is made about whether another search term is in the search term is in the search phrase. If another search term is in the search phrase, then the next search term is processed starting with step 363 in accordance with one or more embodiments of the invention. Once all search terms are processed in the search phrase, the suggested search phrase is created.

The following is an example of generating a search phrase from multiple search terms using the method shown in FIG. 3C. The example is not intended to limit the scope of the invention. For the following example, consider the scenario in which the search terms are "property", "disaster", "repcosts", and "wheretoenter". The reordering of the search terms may order the terms as "wheretoenter repcosts property disaster". "wheretoenter" and "repcosts" may be partitioned into separate keywords to produce the search phrase "where to enter rep costs property disaster". Finally, the spelling of "rep" may be changed to "repair" based on a mapping in the data repository to produce a final suggested search phrase "where to enter repair costs property disaster".

Figure 4A:
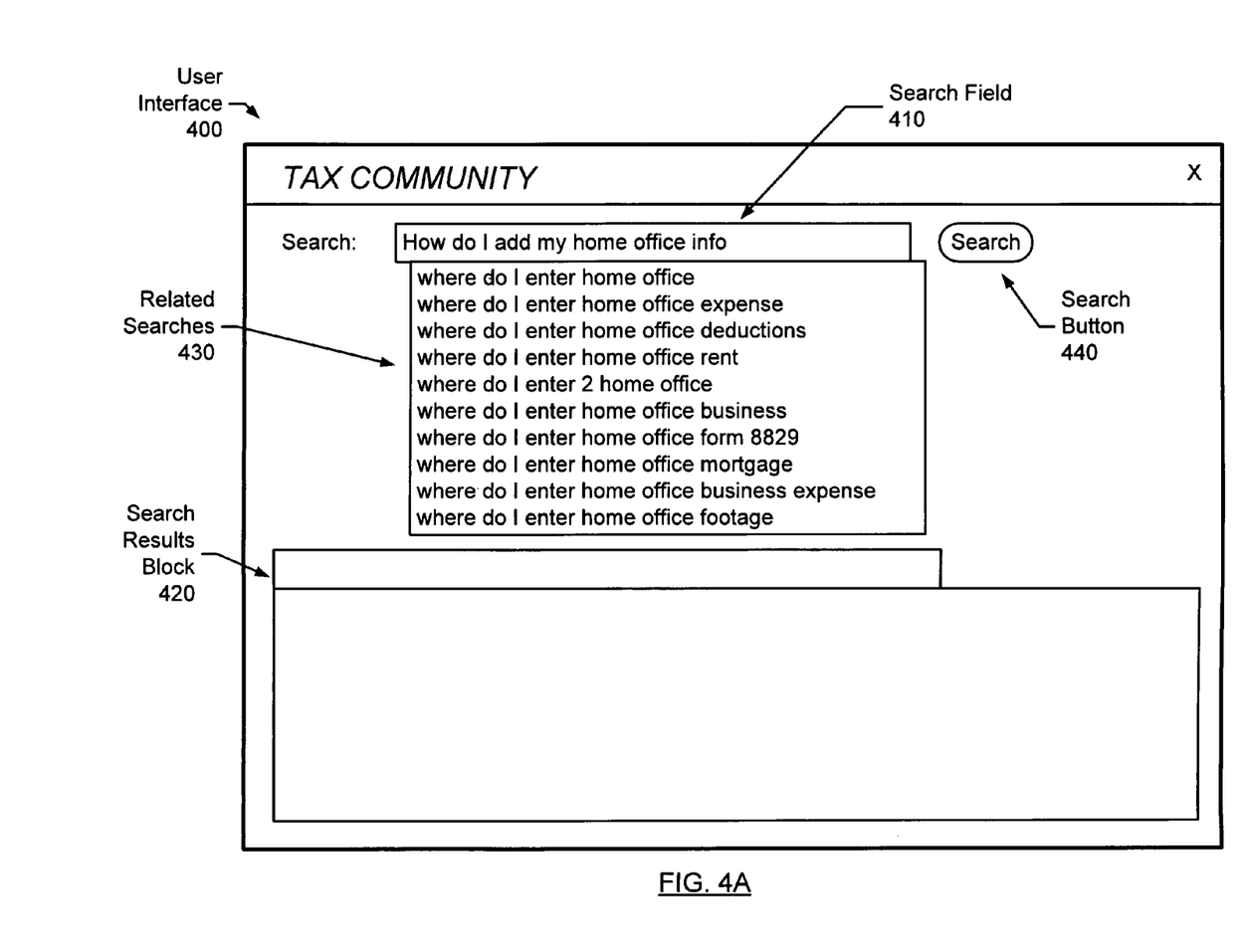
FIGS. 4A-4B show examples of a user interface for searching forms in accordance with one or more embodiments of the invention.

FIG. 4A shows an example of a user interface (400) in accordance with one or more embodiments of the invention that is not intended to limit the invention. The following example is for explanatory purposes only and not intended to limit the scope of the invention. In this example, a user within the "tax community" (i.e., the tax product context) is searching for how to enter home office deductions in a tax form. The user, however, does not remember the word, "deduction". Accordingly, the user types, "How do I add my home office info" into the search field (410). Once the user types in a threshold number of search terms, the system may begin analyzing the search term to find suggested search phrases.

The related searches (430) in the user interface (400) may display different suggested searches. For example, one of the related searches includes the search phrase "where do I enter home office deduction". After seeing the aforementioned search phrase, the user determines that "where do I enter home office deduction" is the search that the user wanted to perform. Accordingly, the user selects "where do I enter home office deduction" and selects the search button (440). A search is executed for the search phrase "where do I enter home office deduction".

Figure 4B:
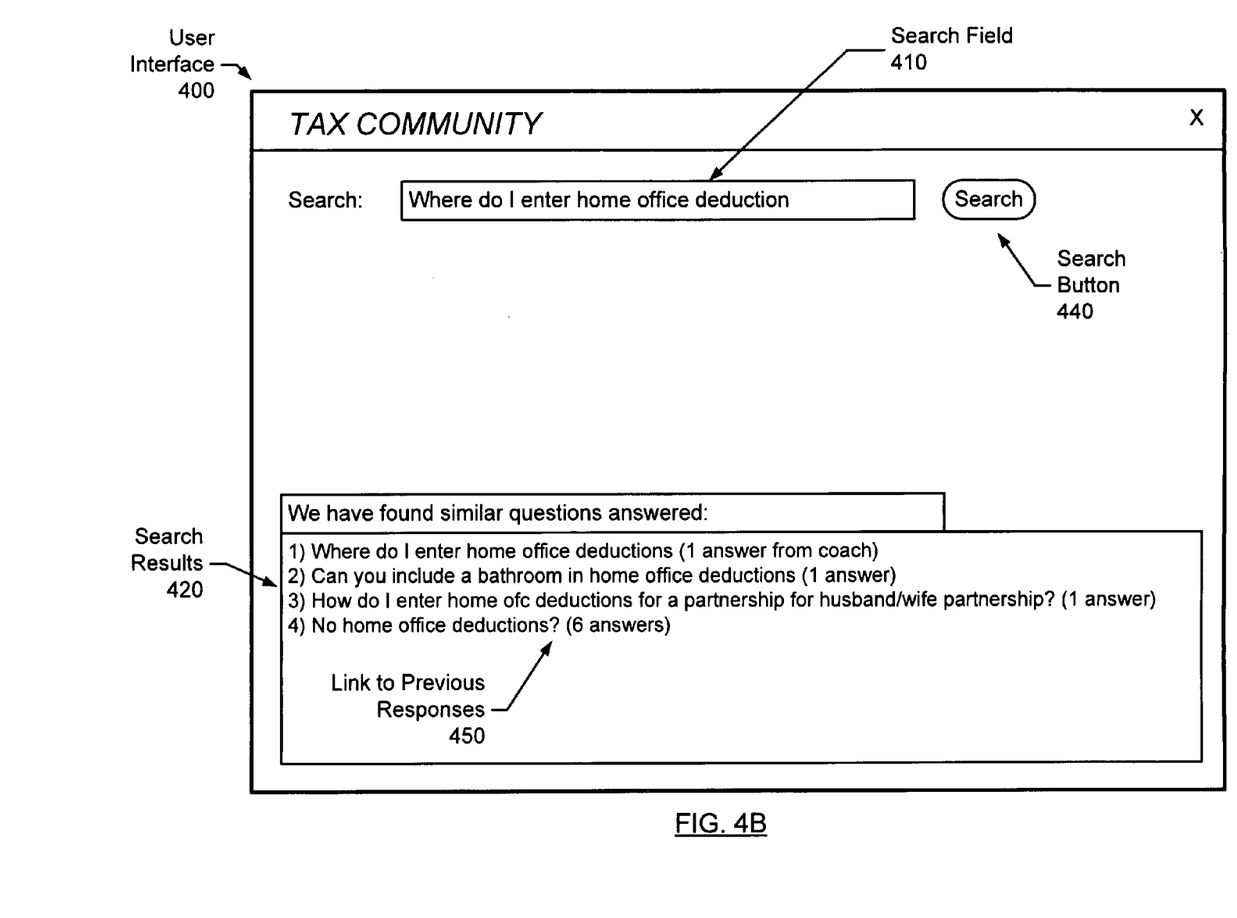

FIG. 4B shows the user interface (400) after the user selects the suggested search phrase. As shown in FIG. 4B, the user interface (400) displays ranked search results (420) related to the tax product context, that are identified based on a search criterion generated from the user entered terms. In this example, the search results (420) are questions previously asked by other users. The search results (420) link to previous responses (450). The user can select one of the links to previous responses (450) to see the answers other users have received. Further, in this example, the search result from a verified tax accountant with the userid "TaxAccountant85" who is a professional in the tax product context is ranked highest because of the individual who provided the answer (i.e., the verified tax accountant's). Thus, even though the user may not know the exact search that the user wants to perform, embodiments of the invention may assist the user in searching for answers to the user's questions.

Figure 5:
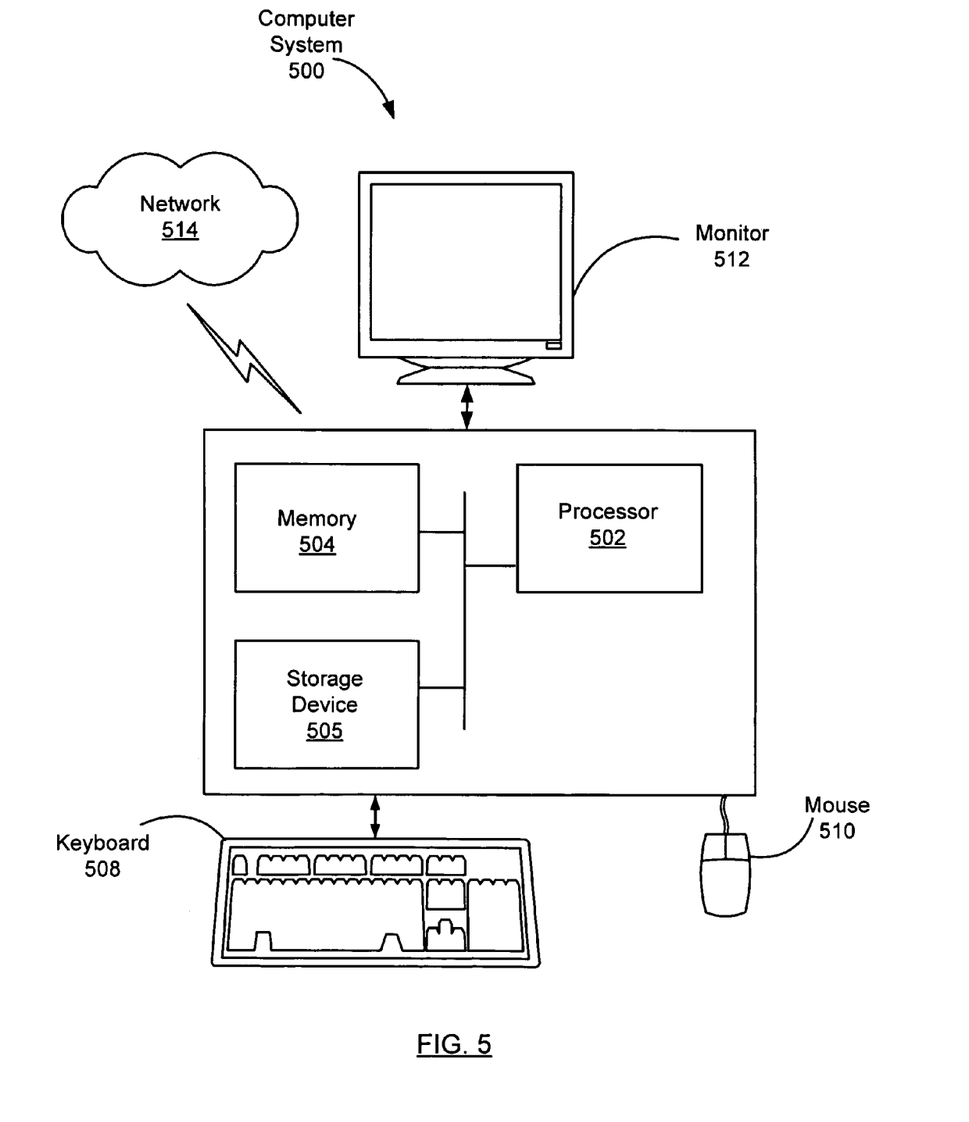
FIG. 5 shows an example of a system for searching in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., data repository, management engine, user interface, and/or any other portion of the invention) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a related search phrase to search a data repository, comprising:
  receiving a first search phrase for a search within a domain of a product;
  evaluating the first search phrase based on the domain of the product, wherein evaluating the first search phrase comprises:
    obtaining a plurality of user-submitted keywords from the first search phrase,
    querying a keyword repository with at least two user-submitted keywords of the plurality of user-submitted keywords to obtain a derivative keyword of a plurality of derivative keywords, wherein the keyword repository relates each of the plurality of user-submitted keywords to at least one of the plurality of derivative keywords,
    identifying a facet from a facet repository using the derivative keyword,
      wherein the facet is a term that is contextually related to the plurality of user-submitted keywords based on historical usage by multiple users of the user-submitted keywords when searching in the domain of the product, and
      wherein the facet, the derivative keyword, and the plurality of user-submitted keywords are used to obtain a plurality of search terms,
    applying a backward filter to revise the plurality of search terms into a second search phrase, and
    identifying a previously submitted question based on the facet, the derivative keyword, and the plurality of user-submitted keywords; and
  displaying the second search phrase and the previously submitted question.

2. The method of claim 1, wherein evaluating the first search phrase further comprises:
  extracting the plurality of search terms from the plurality of user-submitted keywords and the facet, wherein the plurality of search terms are a subset of the plurality of user-submitted keywords.

3. The method of claim 1, wherein the domain of the product is tax preparation.

4. The method of claim 1, wherein the facet is the term that is contextually related to the plurality of user-submitted keywords when a regulation from a legal authority relates the facet to a keyword of the plurality of user-submitted keywords.

5. The method of claim 1, wherein the facet is the term that is contextually related to the plurality of user-submitted keywords when historical search phrases include the facet and a keyword of the plurality of user-submitted keywords.

6. The method of claim 1, wherein a search term of the plurality of search terms is the derivative keyword, and wherein applying the backward filter comprises:
correcting a spelling of the search term.

7. The method of claim 1, wherein applying the backward filter comprises:
ordering the plurality of search terms into the second search phrase, wherein a search term of the plurality of search terms is in a different position in the first search phrase than in the second search phrase.

8. The method of claim 7, wherein applying the backward filter further comprises:
adjusting a grammatical case of the search term according to a position of the search term in the second search phrase.

9. A computer system for generating a related search phrase to search a data repository, comprising:
a processor;
a keyword repository configured to relate each of a plurality of user-submitted keywords to at least one of a plurality of derivative keywords;
a facet repository configured to store a contextual relationship between a keyword of the plurality of user-submitted keywords and a facet, wherein the facet is a term that is contextually related to the plurality of user-submitted keywords based on historical usage by multiple users of the user-submitted keywords when searching in a domain of a product; and
a management engine executing on the processor and operatively connected to the facet repository, the management engine configured to:
receive a first search phrase for a search within the domain of the product;
evaluate the first search phrase based on the domain of the product, wherein evaluating the first search phrase comprises:
obtaining the plurality of user-submitted keywords from the first search phrase,
querying the keyword repository with at least two user-submitted keywords of the plurality of user-submitted keywords to obtain a derivative keyword of the plurality of derivative keywords, and
identifying the facet from the facet repository using the plurality of user-submitted keywords based on the contextual relationship between the facet and the user-submitted keywords,
wherein the facet, the derivative keyword, and the plurality of user-submitted keywords are used to obtain a plurality of search terms,
apply a backward filter to revise the plurality of search terms into a second search phrase, and
identifying a previously submitted question based on the facet, the derivative keyword, and the plurality of user-submitted keywords,
wherein the second search phrase and the previously submitted question are displayed in a user interface.

10. The computer system of claim 9, wherein evaluating the first search phrase further comprises:
extracting the plurality of search terms from the plurality of user-submitted keywords and the facet, wherein the plurality of search terms are a subset of the plurality of user-submitted keywords.

11. The computer system of claim 9, wherein the domain of the product is tax preparation.

12. The computer system of claim 9, wherein the facet is the term that is contextually related to the plurality of user-submitted keywords when a regulation from a legal authority relates the facet to the keyword.

13. The computer system of claim 9, wherein the facet is the term that is contextually related to the plurality of user-submitted keywords when historical search phrases include the facet and one of the plurality of keywords.

14. The computer system of claim 9, wherein a search term of the plurality of search terms is the derivative keyword, and wherein applying the backward filter comprises:
correcting a spelling of the search term.

15. The computer system of claim 9, wherein applying the backward filter comprises:
ordering the plurality of search terms into the second search phrase, wherein the at least one search term of the plurality of search terms is in a different position in the first search phrase than in the second search phrase.

16. The computer system of claim 15, wherein applying the backward filter further comprises:
adjusting a grammatical case of the at least one search term according to a position of the at least one search term in the second search phrase.

17. A computer readable medium comprising computer readable program code embodied therein for causing a computer system to:
receive a first search phrase for a search within a domain of a product;
evaluate the first search phrase based on the domain of the product, wherein evaluating the first search phrase comprises:
obtaining a plurality of user-submitted keywords from the first search phrase,
querying a keyword repository with at least two user-submitted keywords of the plurality of user-submitted keywords to obtain a derivative keyword of a plurality of derivative keywords, wherein the keyword repository relates each of the plurality of user-submitted keywords to at least one of the plurality of derivative keywords,
identifying a facet from a facet repository using the derivative keyword,
wherein the facet is a term that is contextually related to the plurality of user-submitted keywords based on historical usage by multiple users of the user-submitted keywords when searching in the domain of the product, and
wherein the facet, the derivative keyword, and the plurality of user-submitted keywords are used to obtain a plurality of search terms,
applying a backward filter to revise the plurality of search terms into a second search phrase, and
identifying a previously submitted question based on the facet, the derivative keyword, and the plurality of user-submitted keywords; and
display the second search phrase and the previously submitted question.

18. The computer readable medium of claim 17, wherein evaluating the first search phrase further comprises:
extracting the plurality of search terms from the plurality of user-submitted keywords and the facet, wherein the plurality of search terms are a subset of the plurality of user-submitted keywords.

19. The computer readable medium of claim 17, wherein the domain of the product is tax preparation.

20. The computer readable medium of claim 17, wherein the facet is the term that is contextually related to the plurality of user-submitted keywords when a regulation from a legal authority relates the facet to a keyword of the plurality of user-submitted keywords.

21. The computer readable medium of claim 17, wherein the facet is the term that is contextually related to the plurality of user-submitted keywords when historical search phrases include the facet and a keyword of the plurality of user-submitted keywords.

22. The computer readable medium of claim 17, wherein a first search term of the plurality of search terms is the derivative keyword, and wherein applying the backward filter comprises:

correcting a spelling of the first search term;
ordering the plurality of search terms into the second search phrase, wherein a second search term of the plurality of search terms is in a different position in the first search phrase than in the second search phrase; and
adjusting a grammatical case of the second search term according to a position of the second search term in the second search phrase.

\* \* \* \* \*